United States Patent

Higashimura et al.

[11] Patent Number: 5,826,024
[45] Date of Patent: Oct. 20, 1998

[54] MULTIMEDIA INFORMATION DISTRIBUTING SYSTEM

[75] Inventors: Mamoru Higashimura, Tokyo; Masao Kato, Yokohama; Mitsuo Tamura; Akira Inagaki, both of Tokyo; Tsutomu Uenoyama, Kawasaki, all of Japan

[73] Assignee: Matsushita Electric Industrial Co., Ltd., Osaka, Japan

[21] Appl. No.: 921,598

[22] Filed: Sep. 2, 1997

[30] Foreign Application Priority Data

Sep. 2, 1996 [JP] Japan .................................. 8-231566
Jul. 8, 1997 [JP] Japan .................................. 9-182015

[51] Int. Cl.$^6$ ............................................ G06F 17/30
[52] U.S. Cl. .............................. 395/200.44; 395/200.33; 707/104; 348/8; 345/327
[58] Field of Search ............... 395/200.44, 200.43, 395/200.47, 200.57; 707/104, 10; 345/327, 328, 302; 348/7–15

[56] References Cited

U.S. PATENT DOCUMENTS

| | | | |
|---|---|---|---|
| 5,508,732 | 4/1996 | Bottomley et al. | 348/7 |
| 5,581,552 | 12/1996 | Civanlar et al. | 370/396 |
| 5,666,291 | 9/1997 | Scott et al. | 395/200.8 |
| 5,727,048 | 8/1998 | Hiroshima et al. | 379/93.12 |
| 5,734,719 | 3/1998 | Tsevdos et al. | 380/5 |
| 5,737,495 | 4/1998 | Adams et al. | 707/104 |
| 5,745,756 | 4/1998 | Henley | 395/620 |
| 5,752,244 | 5/1998 | Rose et al. | 707/5 |
| 5,754,784 | 5/1998 | Garland et al. | 395/200.49 |

*Primary Examiner*—Larry D. Donaghue
*Attorney, Agent, or Firm*—Lowe Hauptman Gopstein Gilman & Berner

[57] ABSTRACT

A multimedia information distributing system for accumulating multimedia title data to supply title data in accordance with a demand from a client. The multimedia information distributing system is composed of clients and a server which are in communicable relation to each other. Each client includes a material and scenario storage information converting section having a conversion rule between an environment depending upon the client and an internal environment of a title server to convert material position information into a format agreeing with each environment. The client transmits material storage information and a title comprising materials and scenario to the server. The server registers the transmitted title through the use of the material storage information made in advance in the client to agree with the server environment. With this arrangement, it is possible to create, register and reproduce the same title between clients different in expression of the material storage information from each other.

5 Claims, 16 Drawing Sheets

MULTIMEDIA INFORMATION DISTRIBUTING SYSTEM

BACKGROUND OF THE INVENTION

1. [Field of the Invention]

The present invention relates to a multimedia information distributing system which accumulates multimedia title data to supply title data in a format acceptable in reproduction or edit to a client, in accordance with a demand from the client.

2. [Description of the Prior Art]

Recently, due to the speed-up of networks and high-functions of storage units and reproducing units, a multimedia information distributing system has just come into a widespread use, wherein a server has not only unit data such as pictures and voices but also multimedia titles relating the data with each other and sends the multimedia titles through a network to a client which in turn, reproduces the incoming multimedia titles. In this system, the title signifies a data group comprising material data such as a plurality of pictures, sentences and/or voices, with one of or some of the material data being displayed on a reproducing unit in accordance with a reproduction procedures manual called a scenario.

FIG. 16 is an illustration of an arrangement of a prior multimedia information distributing system, where reference numeral 1600 represents a client for creating a title, numeral 1610 designates a server for registering the title and numeral 1630 depicts a different external server.

The client 1600 is composed of a title editing section 1601 for creating a title and material position information, a retention section 1602 for retaining materials in the client 1600, a scenario of the created title and the material position information, a communication section 1603 for establishing the transmission and reception of materials and a processing demand transmission to a server, and a title processing section 1604 for conducting processing such as the registration and reproduction of a title.

The server 1610 comprises a material retention section 1611 for retaining or storing materials the server 1610 manages, a materials communication section 1612 for allowing the materials to be referred to in the client 1600, a title communication section 1613 for receiving, from the client 1600, a title processing demand and component data of a title to be processed, a title processing section 1614 for processing a title specified by the title processing demand received from the client 1600, a temporary retention section 1615 for temporarily retaining a title from the client 1600 before the title processing, and a title retention section 1616 for retaining the registered title.

The external server 1630 is made up of a material retention section 1631 for retaining materials the external server 1630 manages, and a material communication section 1632 for allowing the materials to be referred to in the client 1600.

A description will be made hereinbelow of an operation taken for when registering a title in the above-described multimedia distributing system. Material data are previously retained in the retention section 1602. At this time, due to the circumstances of the creation equipment or the like, the materials may not always be created in the same client. For instance, there may be a case where pupils add pictures or sentences through clients to picture information previously created by a teacher and retained in a specific material server for the teacher. In addition, due to insufficient budget and working space, picture or picture material creating apparatus such as a camera and a scanner are not always installed in all the clients at the creation of the picture information or picture, and therefore, there may be a case where the information are dispersively or separately retained in the servers and clients which have created the respective materials.

Thus, for example, in the case of utilizing the materials within the external server 1630 without taking data in the retention section 1602 in advance, a solution to these problems is achievable through the use of a means to record material positions with material names of the scenario.

A title created is once sent to the temporary retention section 1615 of the server 1610 and then registered on the title retention section 1616.

However, such a prior multimedia information distributing system creates the following problems.

First, in cases where a title is created using the materials retained in a plurality of material servers or in a title creating client itself as mentioned above and registered on a title registerable server and a reproducing demand is made from another client which stands in a different environment, the prior system records in a scenario the material positions of the registered title depending upon the expression way or connection way of the registered title, which makes it difficult to reproduce the title in a client which takes a different title expression way or connection way.

Secondly, in cases where a copy is undesirable on the title server side, for example, when reusing the materials of a material retention means already existing within a title registered server, it is necessary not to apply an excessive load to a network in a such manner as to take a share in the copy without conducting the copy of all materials in the client. However, the prior system does not have an arrangement for solving this problem.

In the third place, it is necessary to, when the registration of titles reusing the same materials is large in number, avoid the vain use of the retention area resulting from the repeated retention of the materials. However, in the prior system, the registration of a scenario is made in units of titles, and hence even the materials with the same contents are repeatedly retained without the examination of the contents. In addition, difficulty is encountered to directly refer to the materials of the registered title. Moreover, for the purpose of eliminating this vain use of the retention area, it is necessary to restore the original material names and the original scenario names when a client obtains a title retained in a server. The prior system does not includes an arrangement for meeting this requirements.

SUMMARY OF THE INVENTION

It is therefore a first object of the present invention to provide a multimedia information distributing system which can easily realize the creation and registration of a title through the use of dispersively managed materials.

A second object of this invention is to provide a multimedia information distributing system which is capable of relieving a load to be applied to a network between a server and a client at registration.

A third object of this invention is to provide a multimedia information distributing system which is capable of suppressing the consumption of a retention area at the registration of a title including materials already registered on a title retention means to accomplish the effective retention of titles.

A fourth object of this invention is to provide a multimedia information distributing system which is capable of ensuring the original material names and scenario names when a client takes a title retained in a server.

A fifth object of this invention is to provide a multimedia information distributing system which is capable of transmitting a plurality of titles from one server to other servers in a state where titles communize the materials.

For the purposes, in accordance with the present invention, there is provided a multimedia information distributing system comprising a client for creating a title composed of a material and a scenario showing a reproducing procedure for the material and a server for registering the title, with the client and the server being in communicable relation to each other, the client including: title editing means for creating the title and further for creating material and scenario storage information showing a storage condition of the material and the scenario necessary for the creation of the title; retention means for retaining the material, the scenario of the title created by the title editing means, and the material and scenario storage information; communication means for carrying out transmission and reception of the material and further for conducting transmission of the scenario, the material and scenario storage information and a title registration instruction for permitting registration of the title with the server; material and scenario storage information converting means for making at least one of mapping (or corresponding relation) and conversion between client recognition information being the material and scenario storage information recognizable on the client side and server recognition information being the material and scenario storage information recognizable on the server side; and title processing control means for controlling the title editing means, the retention means, the communication means and the material and scenario storage information converting means and further for creating the title registration instruction, and the server including: title communication means for receiving the material and scenario constituting the title, the material and scenario storage information, and the title registration instruction; temporary retention means for temporarily retaining the material and the scenario received by the title communication means; title retention means for registering the title composed of the material and the scenario retained in the temporary retention means; and title processing control means for controlling the title communication means, the temporary retention means, and the title retention means, wherein, after the material and the scenario transmitted from the client are retained in the temporary retention means, the title processing control means of the client gives an instruction to the material and scenario storage information converting means to convert the material and scenario storage information of the title retained in the temporary retention means, which is the client recognition information, into the server recognition information and transmits the server recognition information and the title registration instruction of the title to the server, and further, the title processing control means of the server registers on the title retention means the title comprising the material and the scenario retained in the temporary retention means on the basis of the transmitted server recognition information and the title registration instruction.

Furthermore, in accordance with this invention, there is provided a multimedia information distributing system comprising a client for creating a title composed of materials and a scenario showing a reproducing procedure for the materials and a server for registering the title, with the client and the server being in communicable relation to each other, the client including: title editing means for creating the title and further for creating material and scenario storage information showing a storage condition of the materials and the scenario necessary for the creation of the title; retention means for retaining the materials, the scenario of the title created by the title editing means, and the material and scenario storage information; communication means for carrying out transmission and reception of the materials and further for conducting transmission of the scenario, the material and scenario storage information and a title registration instruction for permitting registration of the title with the server; and title processing control means for controlling the title editing means, the retention means and the communication means, and further for creating the title registration instruction, and the server including: title communication means for receiving the materials and scenario constituting the title, the material and scenario storage information, and the title registration instruction; temporary retention means for temporarily retaining the materials and the scenario received through the title communication means; title retention means for registering the title composed of the materials and the scenario retained in the temporary retention means; and title processing control means for controlling the title communication means, the temporary retention means, and the title retention means, wherein the title processing control means of the client give an instruction to the communication means to send to the server, of the materials, a material defying reference and collection from the server, while the title processing control means of the server gives an instruction to the title communication means to collect the materials other than the material from the client.

Still further, in accordance with this invention, there is provided a multimedia information distributing system comprising a client for creating a title composed of a material and a scenario showing a reproducing procedure for the material and a server for registering the title, with the client and the server being in communicable relation to each other, the client including: title editing means for creating the title and further for creating material and scenario storage information showing a storage condition of the material and the scenario necessary for the creation of the title; retention means for retaining the material, the scenario of the title created by the title editing means, and the material and scenario storage information; communication means for carrying out transmission and reception of the material and further for conducting transmission of the scenario, the material and scenario storage information and a title registration instruction for permitting registration of the title with the server; material and scenario storage information converting means for making at least one of mapping and conversion between client recognition information being the material and scenario storage information recognizable on the client side and server recognition information being the material and scenario storage information recognizable on the server side; and title processing control means for controlling the title editing means, the retention means, the communication means and the material and scenario storage information converting means and further for creating the title registration instruction, and the server including: title communication means for receiving the material and scenario constituting the title, the material and scenario storage information, and the title registration instruction; temporary retention means for temporarily retaining the material and the scenario received by the title communication means; title retention means for registering the title in units of the scenario retained in the temporary retention means and a kind of the material; material examining means for checking whether or not the material constituting the title specified by the client is already retained in the title retention means; and title processing control means for controlling the title communication means, the temporary retention means, the title retention means and the material examining means, wherein, when the title retention means registers the title, the title processing control means of the server updates the contents of the scenario constituting the title and the name of the material on the basis of the comparison of an examination result of the material examining means with the material retained in the title retention means.

Moreover, in accordance with this invention, there is provided a multimedia information distributing system comprising a client for creating a title composed of a material and a scenario showing a reproducing procedure for the material and a server for registering the title, with the client and the server being in communicable relation to each other, the client including: title editing means for creating the title and further for creating material and scenario storage information showing a storage condition of the material and the scenario necessary for the creation of the title; retention means for retaining the material, the scenario of the title created by the title editing means, and the material and scenario storage information; communication means for carrying out transmission and reception of the material and further for conducting transmission of the scenario, the material and scenario storage information and a title registration instruction for permitting registration of the title with the server; material and scenario storage information converting means for making at least one of mapping and conversion between client recognition information being the material and scenario storage information recognizable on the client side and server recognition information being the material and scenario storage information recognizable on the server side; and title processing control means for controlling the title editing means, the retention means, the communication means and the material and scenario storage information converting means and further for creating the title registration instruction, and the server including: title communication means for receiving the material and scenario constituting the title, the material and scenario storage information, and the title registration instruction; temporary retention means for temporarily retaining the material and the scenario received by the title communication means; title retention means for registering the title in units of the scenario retained in the temporary retention means and a kind of the material; material examining means for checking whether or not the material constituting the title specified by the client is already retained in the title retention means; title processing control means for controlling the title communication means, the temporary retention means, the title retention means and the material examining means; and means for, when the title specified by the client is registered with the title retention means, creating information about the relation between the name of the material, constituting the title, before the registration and the name of the material after the registration.

In addition, in accordance with this invention, there is provided a multimedia information distributing system comprising a transmission server having a title comprising a material and a scenario showing a reproducing procedure for the material and a reception server for registering the title, with the transmission server and the reception server being in communicable relation to each other, the transmission server including: title retention means having the title in units of the scenario and a kind of the material; communication means for performing transmission of the scenario and material constituting the title; and title transmission control means for controlling the title retention means and the communication means, the reception server including: title communication means for receiving the material and scenario constituting the title; title retention means for registering the title in units of the scenario constituting the title and a kind of the material; and title processing control means for controlling the title communication means and the title retention means, wherein, when a plurality of titles the title retention means of the transmission server possesses are registered with the reception server, the title transmission control means communizes materials constituting the plurality of titles and then transmits the materials and scenarios constituting the titles, while the title processing control means registers the transmitted scenarios and materials with the title retention means in a form left untouched.

That is, information listing material and scenario storage information for material data constituting a title is created at the creation of the title, and the material data are collected at every title in accordance with the aforesaid information at the registration of the title and registered with a title server. In this case, since the expression of the material storage information is different at every client, each client possesses a conversion rule between the expression depending upon the client and the expression depending upon the title server, and is provided with a means which converts the contents of the material and scenario position information. Thus, the collection of the materials and the conversion of the material and scenario position information depending upon the client are automatically made at the registration of a title comprising materials dispersively retained. The client under a different environment can create the title by using the materials registered with a plurality of servers, or another client can reproduce the title.

Furthermore, when materials are collected in the temporary retention means of a server for the registration of a title, the server with which the registration is made and a client share the copy or duplication (collecting and transmitting materials and retaining them in the temporary retention means) of the materials as follows. That is, the client duplicates the materials which defy the reference from the server whereas the server with which the registration is made duplicates the materials other than the reference defying materials. The effective use of a network between the server and the client is possible for the registration of a title.

Still further, since the material examining means is provided to check whether or not the material constituting the title specified by the client is already retained in the title retention means, the contents of a scenario and the names of materials are changed and retained in order to avoid the duplication of the materials to be referred to among a plurality of titles, which achieves the effective use of the retention unit of a server. In the case that there are many titles in which the materials are frequently reused, the effective use of the title retention area is feasible. In addition, a means is provided to create information about the relationship between the names of the materials, constituting the title, before the registration and the names of the materials after the registration. In this case, different information is created without changing the name of the material within the scenario at the material registration, and hence a title can be derived using the original material name.

Moreover, since the multimedia information distributing system comprises the transmission server for creating and transmitting a list of the materials to be transmitted at the transmission of a plurality of titles between servers and the reception server for receiving and retaining the materials with reference to the list in a state that the materials are communized, in the case of transmitting a plurality of titles together to a different server during the nighttime period that the transmission circuit use charge is cheap, it is possible to reduce the transferring data quantity to improve the transmission circuit use efficiency, and further to reduce the load on a network between servers by transmitting materials in a communized condition when a plurality of titles are transmitted together between the servers. Particularly, in the case that the number of titles where the materials are frequently reused is large, the transferring load on the network is reducible.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION (First Embodiment)

First of all, a description will be made hereinbelow of a multimedia information distributing system according to a first embodiment of the present invention.

Figure 1:
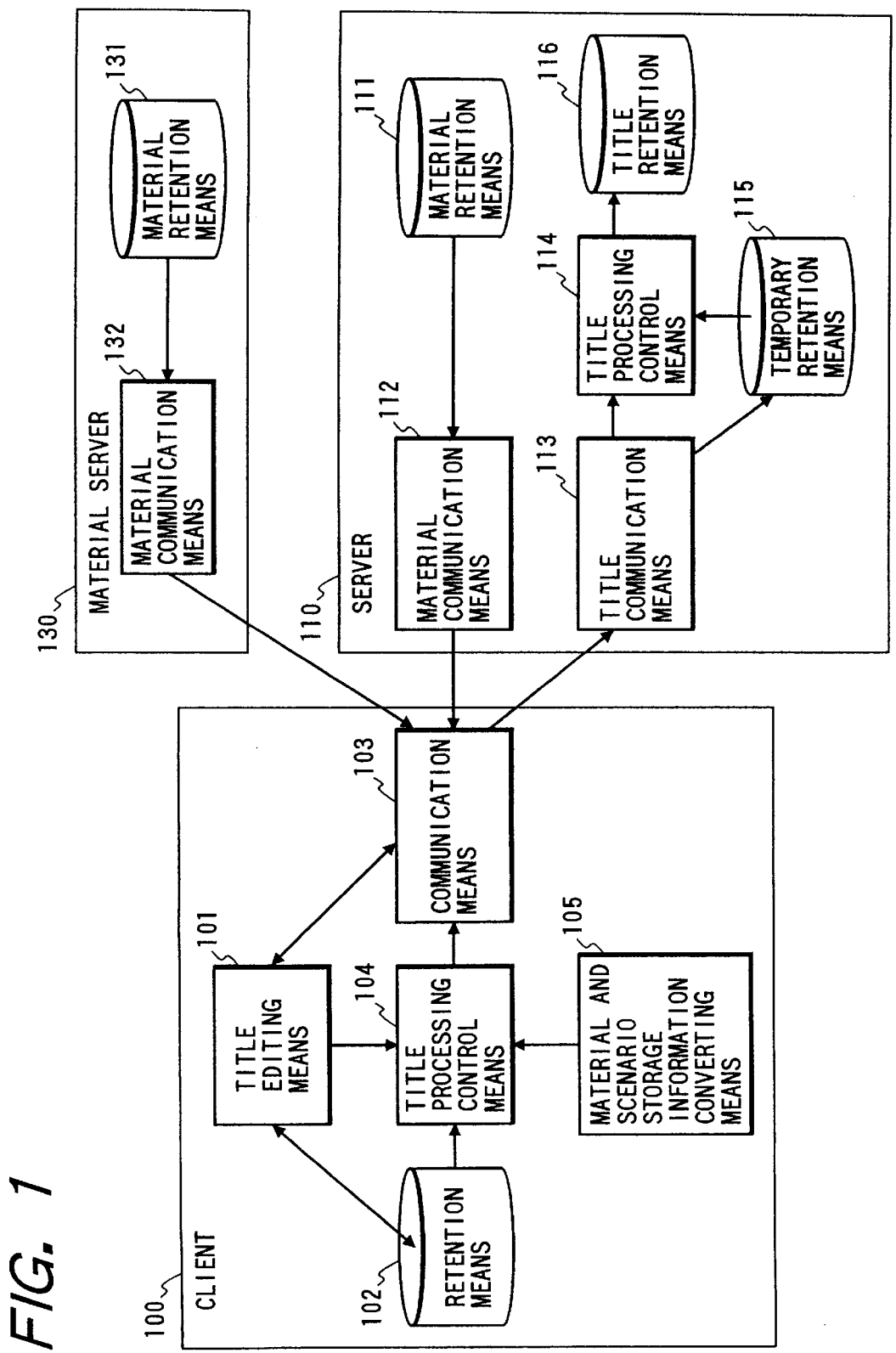
FIG. 1 is an illustration of an arrangement of a multimedia information distributing system according to a first embodiment of the present invention.

FIG. 1 is an illustration of one example of arrangements of a multimedia information distributing system according to this embodiment. In FIG. 1, reference numeral 100 denotes a client for creating a title comprising materials, such as animation, still pictures, voices and texts, and a reproduction procedure (which will be referred hereinafter to as a scenario) for giving a description as to how to reproduce the materials, numeral 110 stands for a server for registering a title, and numeral 130 signifies a material server for retaining materials other than those in the server 110.

The client 100 includes a title editing means 101 for creating a title and further for creating material and scenario storage information for describing the stored conditions of materials and scenarios, a retention means 102 for retaining the materials in the client 100, a scenario(s) of the created title and the material and scenario storage information, a communication means 103 for performing the transmission and reception of materials and the transmission of a processing demand to a server, a title processing control means 104 for taking the change of the control of operations including the registration and reproduction of a title on the client 100, and a material and scenario storage information converting means 105 having a conversion rule between an environment depending upon the client 100 and an internal environment of the server 110 to convert the material and scenario storage information into a format matching with each environment.

Furthermore, the server 110 comprises a material retention means 111 for retaining the materials the server 110 manages, a material communication means 112 for allowing the materials to be referred to in the client 10, a title communication means 113 for receiving, from the client 100, a title processing demand and component data of a title to be processed, a title processing control means 114 for processing a title specified by the title processing demand from the client 100, a temporary retention means 115 for temporarily retaining the title received from the client 100 before the title processing, and a title retention means 116 for retaining a title registered.

Still further, the server 130 is composed of a material retention means 131 for retaining the materials the server 130 manages, and a material communication means 132 for allowing the materials to be referred to in the client 100.

Figure 2:
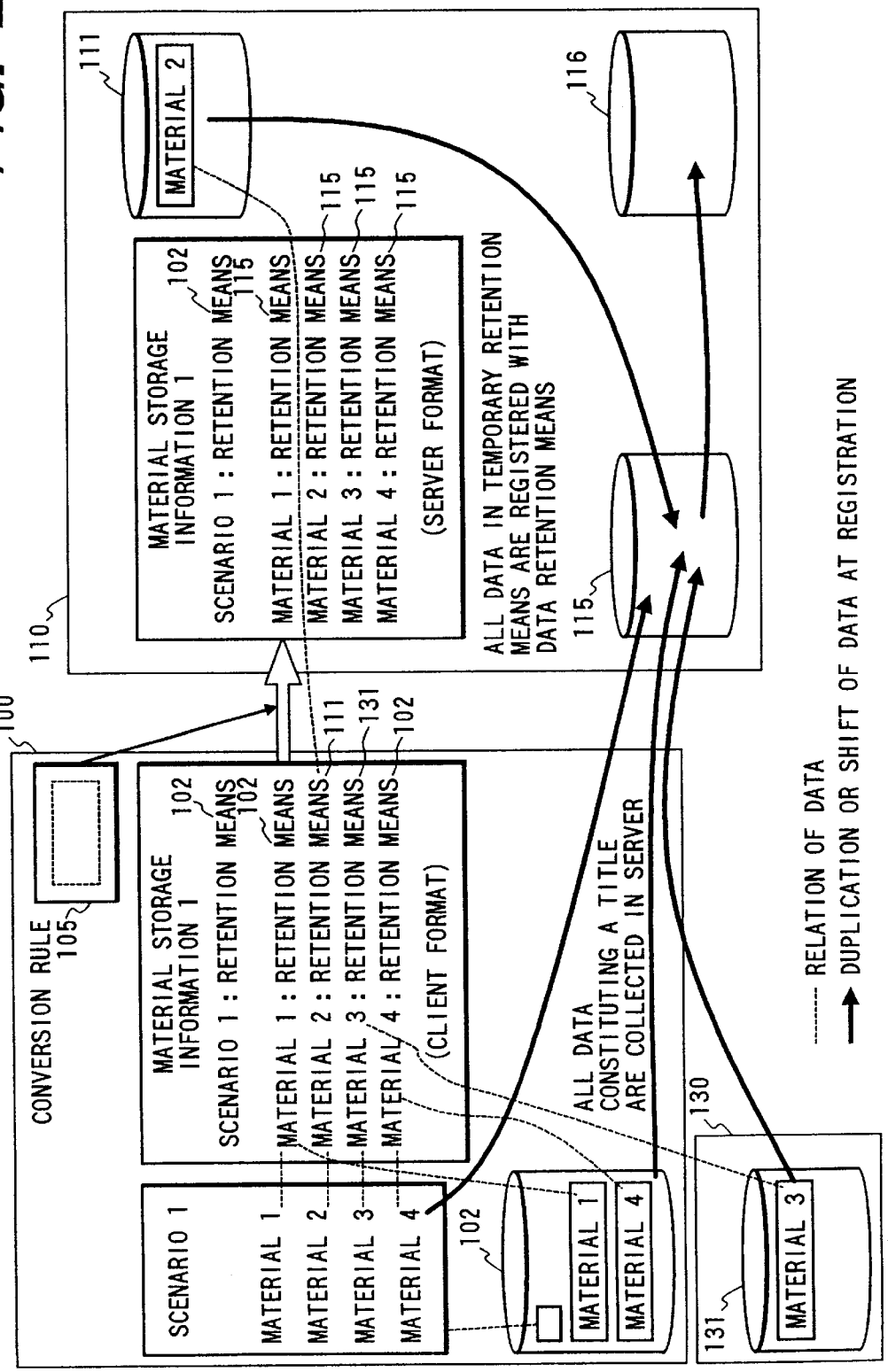
FIG. 2 is an illustration of a file correlation in the multimedia information distributing system according to the first embodiment of this invention.
Figure 3:
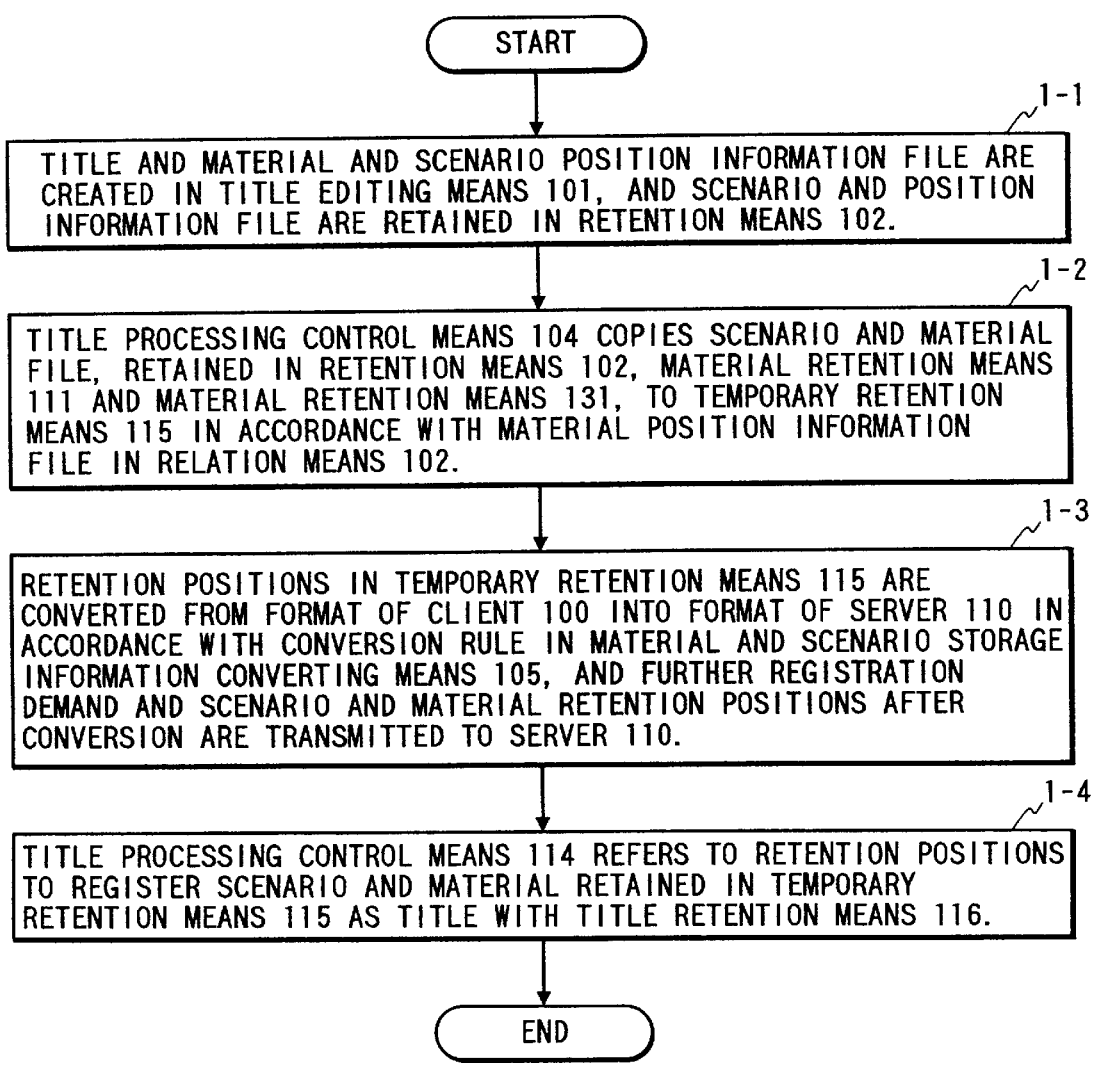
FIG. 3 is a flow chart showing an operation of the multimedia information distributing system according to the first embodiment of this invention.

FIG. 2 is an illustration file correlation in the multimedia information distributing system according to this embodiment, showing a state in which the client 100 collects all data (all the materials and a scenario(s)) constituting a title and sends them to the server 110. FIG. 3 is a flow chart showing the flow of an operation of the multimedia information distributing system according to this embodiment.

Referring to FIGS. 1 to 3, a description will be made hereinbelow of an operation taken for when a title created in the client 100 is registered on or with the server 110 on the basis of material and scenario storage information, in the multimedia information distributing system thus arranged.

In FIG. 3, in a step 1-1, the user of the client 100 first creates a title through the use of the title editing means 101. At the addition of new materials, only material names are added to the scenario, and the material names, material existing positions and material information are written in a material and scenario storage information file prepared apart from the scenario. Whereupon, the material data to be referred to in the scenario includes not only the materials in the retention means 102 of the client but also the materials in the material retention means 111 of the server 110 and even the materials in the material retention means 131 of the material server 130. After the creation, the scenario and the material and scenario storage information for the completed title are retained in the retention means 102.

Furthermore, in a step 1-2, in response to a title registration instruction from the client user, the title processing control means 104 reads out the material and scenario storage information from the retention means 102 to check the material and scenario storage place corresponding to the specified title. The title processing control means 104 reads out all the material and scenarios for the aforesaid title and give an instruction through the communication means 103 and the title communication means 113 for retaining them in the temporary retention means 115 of the server 110.

Still further, in a step 1-3, after the completion of the retention of the materials, through the use of the material and scenario storage information converting means 105 the title processing control means 104 performs the updating from the original material positions of the material and scenario storage information in a format to be used in the client 100 to the material positions in the temporary retention means 115 in a format to be used in the server 110, and sends the registration instruction and the material and scenario storage information after the conversion to the server 110.

Moreover, in a step 1-4, the title processing control means 114 refers to the converted material and scenario storage information to register on the title retention means 116 the scenario and the materials retained in the temporary retention means 115.

As described above, in this embodiment, the material and scenario storage information converting means 105 for conducting the conversion of the pass environments or the like of files different from each other between the client 100 and the server 110 is provided in the client 100, with the result that, at the registration of a title comprising the materials dispersively retained, the collection of the materials and the conversion of the material and scenario storage information depending upon the client 100 can automatically be made without user's awareness. In addition, at the registration operation, through the temporary creation of the material storage information, it is possible to easily register a title referring to the dispersively retained materials and further to reproduce it even from a different client, which can offer great practical effects.

(Second Embodiment)

Secondly, a description will be taken hereinbelow of a multimedia information distributing system according to a second embodiment of the present invention.

Figure 4:
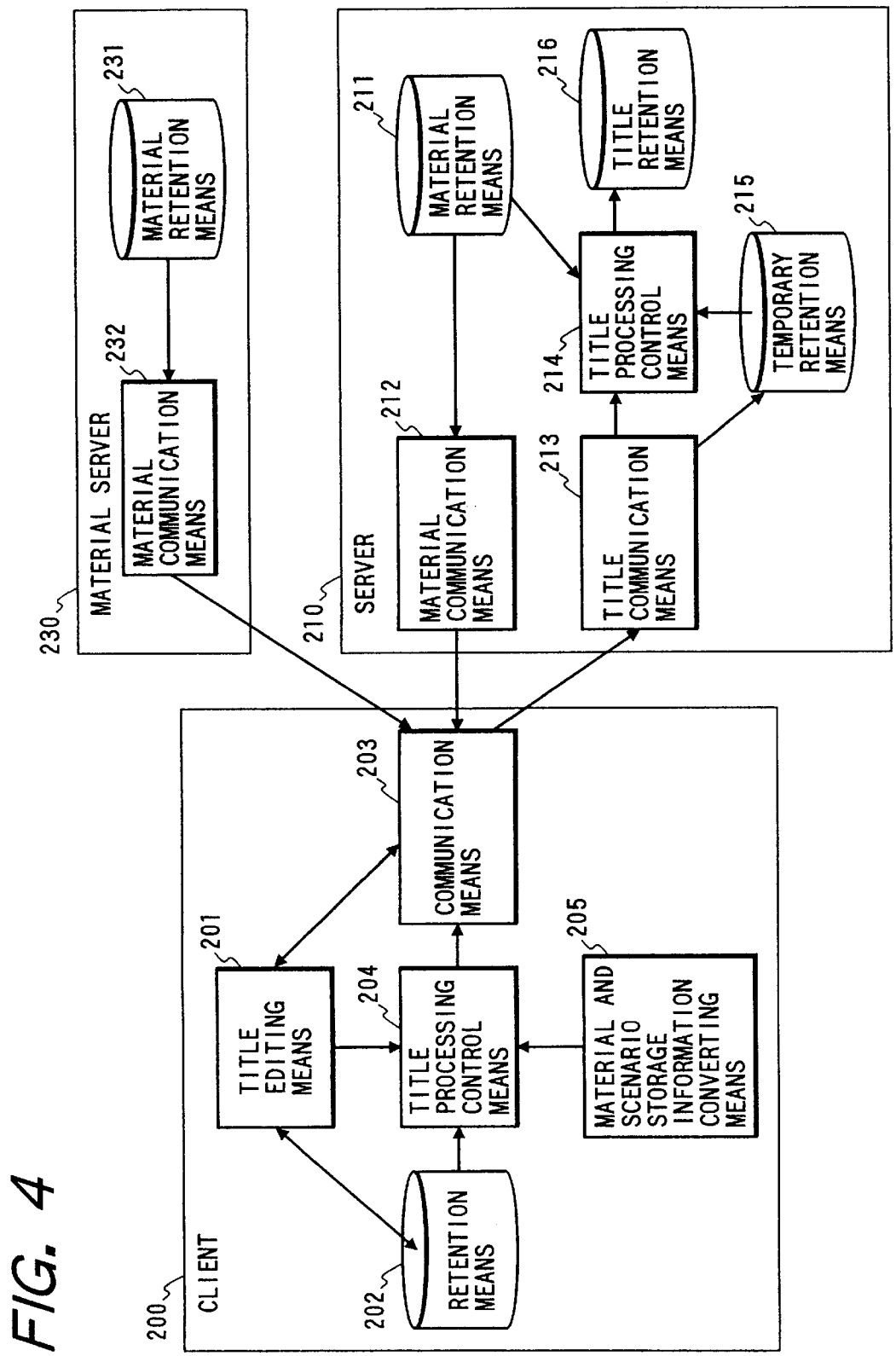
FIG. 4 is an illustration of an arrangement of a multimedia information distributing system according to a second embodiment of the present invention.

FIG. 4 is an illustration of one example of arrangements of the multimedia information distributing system according to this embodiment. In FIG. 4, reference numeral 200 represents a client for creating a title, numeral 210 designates a server for registering the title, and numeral 230 denotes a material server for retaining materials other than those in the title server 210.

The client 200 is composed of a title editing means 201 for creating a title and material and scenario storage information, a retention means 202 for retaining the materials in the client 200, a scenario(s) of the created title and the material and scenario storage information, a communication means 203 for performing the transmission and reception of materials and the transmission of a processing demand to a server, a title processing control means 204 for conducting the control of the registration and reproduction of a title, and a material and scenario storage information converting means 205 having a conversion rule between an environment depending upon the client 200 and an internal environment of the server 210 to convert the material and scenario storage information into a format agreeing with each environment.

Furthermore, the server 210 is made up of a material retention means 211 for retaining the materials the server 210 manages, a material communication means 212 for allowing the materials to be referred to in the client 200, a title communication means 213 for receiving, from the client 200, a title processing demand and component data of a title to be processed, a title processing control means 214 for executing the control to receive the title processing demand from the client 200, to retain the materials other than the materials from the client 200 in a temporary retention means 215 and to then process a specified title, the temporary retention means 215 for temporarily retaining the title received from the client 100 before the title processing, and a title retention means 216 for retaining the registered title.

Moreover, the server 230 includes a material retention means 231 for retaining the materials the server 230 manages, and a material communication means 232 for allowing the materials to be referred to in the client 200.

Figure 5:
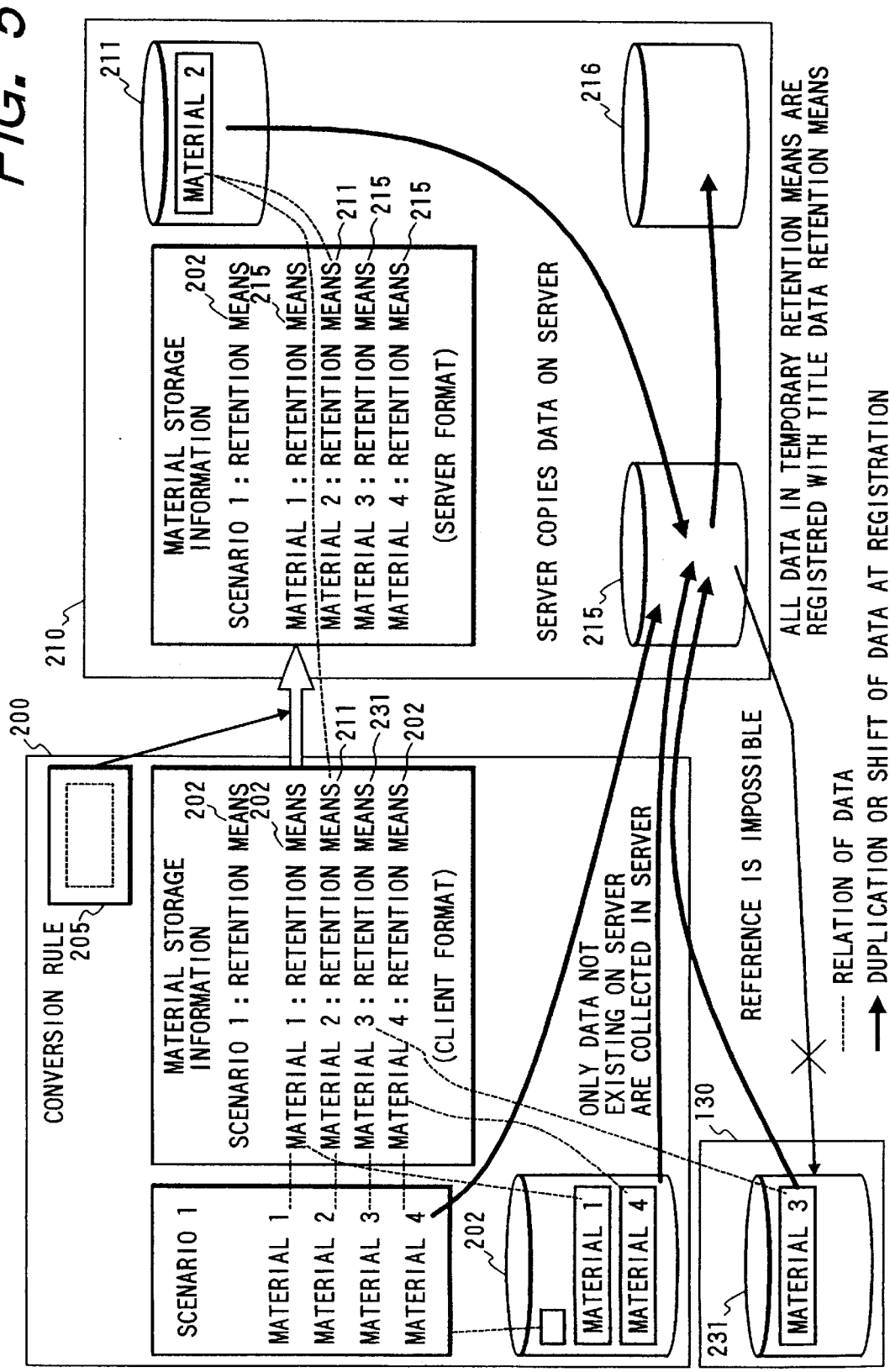
FIG. 5 is an illustration of a file correlation in the multimedia information distributing system according to the second embodiment of this invention.
Figure 6:
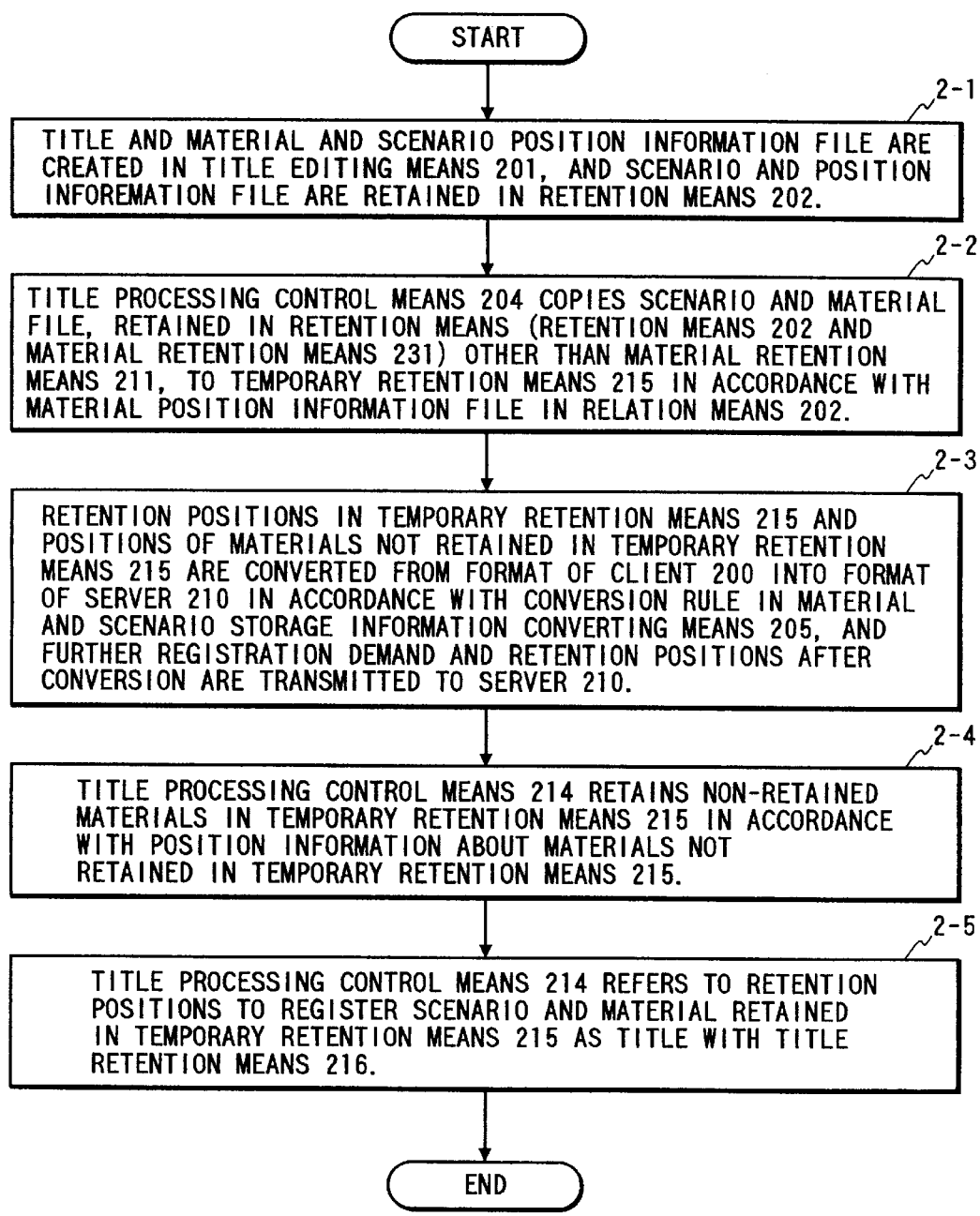
FIG. 6 is a flow chart showing an operation of the multimedia information distributing system according to the second embodiment of this invention.

FIG. 5 is an illustration of a file correlation of the multimedia information distributing system according to this embodiment, showing a state in which the client 200 transmits, of the materials constituting a title to be registered, the materials which have difficulty in the reference from the server 200 to the server 210 and the server 210 collects the remaining materials and the title is registered thereon. FIG. 6 is a flow chart showing the flow of an operation of the multimedia information distributing system according to this embodiment.

Referring to FIGS. 4 to 6, a description will be made hereinbelow of an operation taken for when a title edited in the client 200 is registered through the material and scenario storage information on the server 210, in the multimedia information distributing system thus arranged.

In FIG. 6, in a step 2-1, as well as the steps of FIG. 3 in the first embodiment, the client 200 transmits the materials constituting the specified title to the server 210 and performs the conversion of the material and scenario storage information to send the conversion result to the server 210.

Furthermore, in a step 2-2, the title processing control means 204 refers to the material and scenario storage information to read the materials (that is, the materials retained in the retention means 202 and the material retention means 231) other than the materials whose positions are in the material retention means 231 of the server 210 to give the read materials to the server 210 and sends the material and scenario storage information after the conversion and a title registration demand to the server 210. As a result, the temporary retention means 215 of the title server 210 retains the materials other than the materials existing in the material retention means 211 and the scenario.

Still further, in a step 2-3, when receiving the title registration demand and the converted material and scenario storage information in the above step 2-2 from the client 200, the title processing control means 214 of the server 210 refers to the material and scenario storage information to shift the materials, whose positions exist in the material retention means 211, from the material retention means 211 to the temporary retention means 215, thus retaining them in the temporary retention means 215.

Moreover, in a step 2-4, all the materials constituting the specified title are kept in the temporary retention means 215.

In addition, in a step 2-5, the registration operations subsequent to this operation are done as well as the step 1-4 of FIG. 3 in the first embodiment.

As described above, according to this embodiment, when collecting the material data constituting the title, only the materials which can not be referred to from the server are transmitted to the server, and the server collects the remaining materials after the reception, that is, the client 200 and the server 210 share the collection of the material data and the network between the server and the client is effectively used to register the title, and hence it is possible to reduce the load of the network between the client and the server, which can offer great practical effects.

(Third Embodiment)

Furthermore, a description will be made hereinbelow of a multimedia information distributing system according to a third embodiment of this invention.

Figure 7:
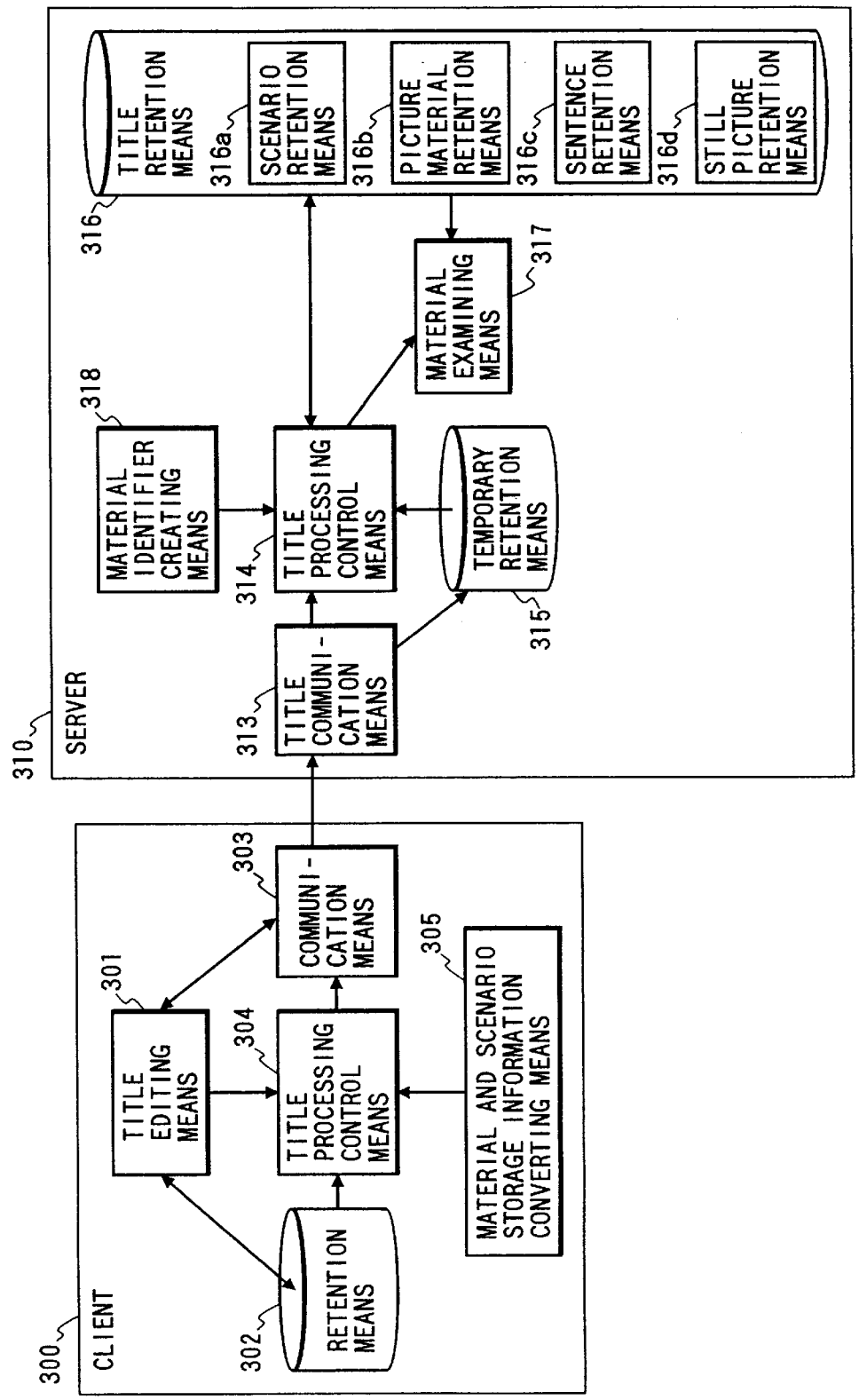
FIG. 7 is an illustration of an arrangement of a multimedia information distributing system according to a third embodiment of the present invention.

FIG. 7 is an illustration of an example of arrangements of a multimedia information distributing system according to this embodiment. In FIG. 7, reference numeral 300 denotes a client for creating a title, and numeral 310 depicts a server for registering the title.

The client 300 includes a title editing means 301 for creating a title and material and scenario storage information, a retention means 302 for retaining the materials in the client 300, a scenario(s) of the created title and the material and scenario storage information, a communication means 303 for conducting the transmission and reception of materials and performing the transmission of a processing demand to a server, a title processing control means 304 for carrying out registration processing of a title, and a material and scenario storage information converting means 305 having a conversion rule between an environment depending upon the client 300 and an internal environment of the server 310 to convert the material and scenario storage information into a format agreeing with each environment.

Furthermore, the server 310 is composed of a title communication means 313 for receiving, from the client 300, a title processing demand and component data of a title to be processed, a title processing control means 314 for receiving the title processing demand from the client 300 and for processing the specified title after retaining the remaining materials other than the materials the client 300 receives in a temporary retention means 315, the temporary retention means 315 for temporarily retaining the title from the client 300 before the title processing, a title retention means 316 for retaining the registered title in accordance with the materials, a material examining means 317 for checking whether or not the materials constituting the specified title already exist in the title retention means 316, and a material identifier creating means 318 for creating an identifier to make the change to a single-meaning data name to avoid the duplication of the materials and names already retained in the title retention means 316 at new registration of materials. Further, the title retention means 316 includes a scenario retention means 316a, a picture material retention means 316b, a sentence retention means 316c and a still picture retention means 316d. The materials retained in the title retention means 316 includes voices in addition to the aforesaid pictures, sentences and still pictures.

Figure 8:
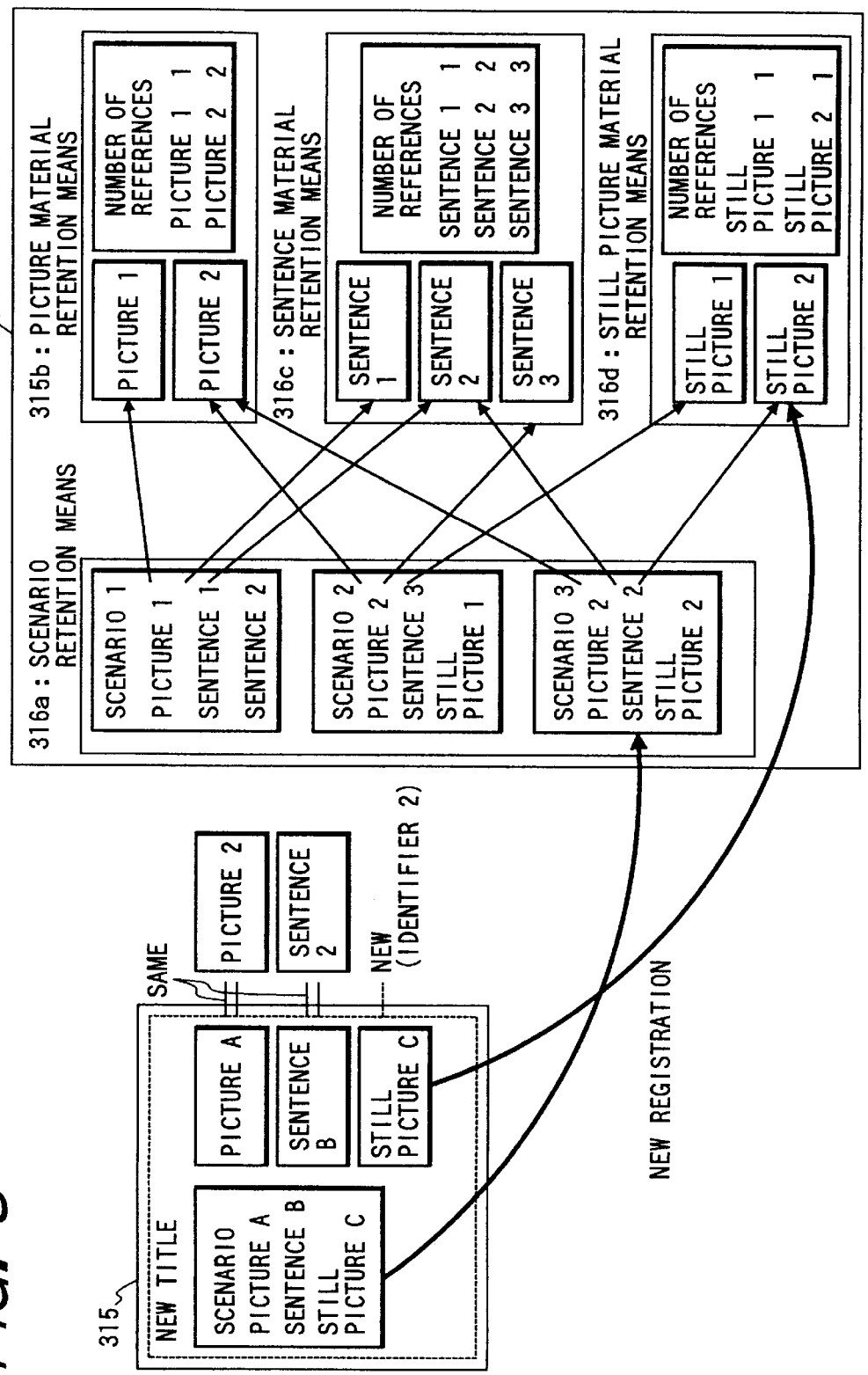
FIG. 8 is an illustration of a material communizing state in the multimedia information distributing system according to the third embodiment of this invention.
Figure 9:
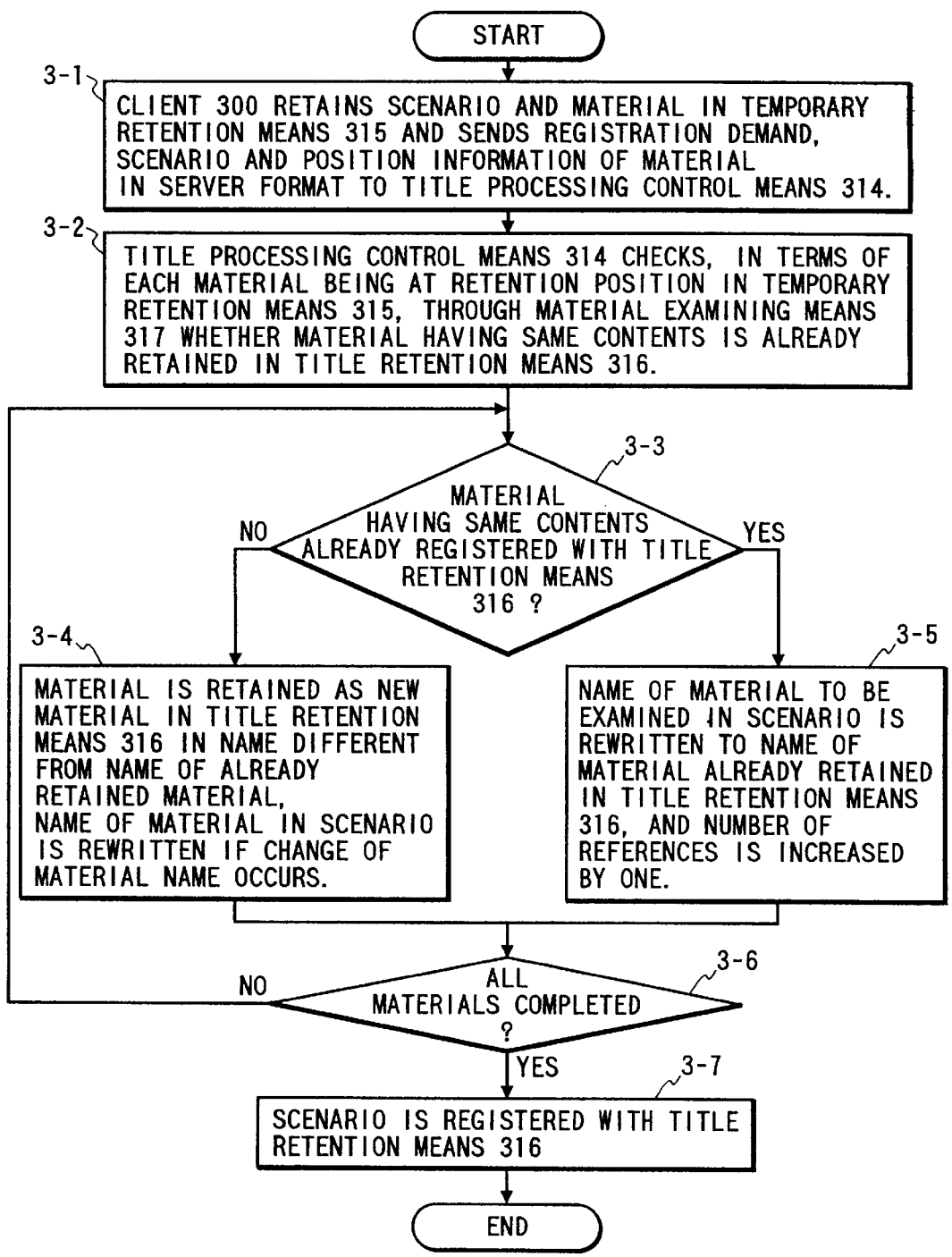
FIG. 9 is a flow chart showing an operation of the multimedia information distributing system according to the third embodiment of this invention.

FIG. 8 shows a material communizing state of the multimedia information distributing system according to this embodiment. When the data (the scenario and materials constituting the title specified by the client) retained in the temporary retention means 315 is registered with the title retention means 316, check is made whether or not the materials constituting the specified title already exist in the title retention means 316, thus updating the name of each of materials and the contents of the scenario in accordance with the situation. FIG. 9 is a flow chart showing the flow of an operation of the multimedia information distributing system according to this embodiment.

Referring to FIGS. 7 to 9, a description will be made hereinbelow of an operation taken for when, in terms of the title edited in the client 300, in the server 310 the materials in the temporary retention means 315 are separately registered through the material and scenario storage information on the title retention means 316 in accordance with the kinds of the materials.

In FIG. 9, in a step 3-1, all the materials of the specified title from the client 300 are retained into the temporary retention means 315 of the server 310. This operation is completely the same as that of the first embodiment (the step 1-1 of FIG. 3) and the second embodiment (the step 2-1 of FIG. 6).

In a step 3-2, in terms of the respective material data constituting the specified title, the title processing control means 314 checks through the material examining means 317 in accordance with the following procedure whether or not the material with the same contents exists in the title retention means 316. As one of the examining ways, of the materials in the retention means for the materials whose kind is the same as that of the material to be examined, for example, of the materials in the picture material retention means 316b if the examination is made about the picture materials, the material data having the completely same data size as that of the material to be examined are retrieved and simply compared in entire contents with the materials to be examined.

In a step 3-3, if the result of the aforesaid examination shows that the materials having the completely same contents do not exist in the title retention means 316, the examined material data itself are required to be retained in the title retention means 316, and hence, the operation advances to a step 3-4 and the following steps. On the contrary, if the completely same materials exist therein, there is no need for retaining the materials examined, and hence the operation proceeds to a step 3-5 and the following steps. That is, if the material having the same contents is already registered with the title retention means 316, the operational flow goes to the step 3-5, and if not, the operational flow advances to the step 3-4.

In the step 3-4, if the material having the same name as that of the material to be examined already exists in the title retention means 316, for example, in the case of picture materials, the material identifier creating means 318 produces an identifier to change the name of the material to be newly registered to a single-meaning material name in the picture material retention means 316b in order to avoid the superscription of the newly registered material on the existing material. The name of the newly registered material is changed in accordance with the identifier and the newly registered material is retained in the corresponding material retention means of the title retention means 316, and the corresponding material name within the scenario is changed to a new material name, and further reference-number information about the new material in the title retention means 316 is produced and set to "1".

In the step 3-5, on the other hand, in the case that the material is not registered because the same material already exists in the title retention means 316, the corresponding material name in the scenario is changed to the existing material with the same contents, and the number of references from the title of the corresponding material data in the title retention means 316 is increased by one.

In a step 3-6, the above-described steps 3-3 to 3-5 are repeatedly executed for all the materials constituting the title to be processed.

Furthermore, in a step 3-7, finally the title processing control means 314 retains the scenario of the specified title in the scenario retention means 316a. The material and scenario storage information is deleted because of being temporary information for the delivery and reception of the material data.

As described above, according to this embodiment, when the title retention means 316 separately registers the component data for a title in accordance with the kinds of materials, in the case that the materials referred to in connection with a plurality of titles completely have the same contents, an arrangement is made to register a scenario corrected to refer to only one body (contents) of the aforesaid material, the number of titles to be referred to and the aforesaid singly retained material, and therefore, it is possible to prevent the materials having the completely same contents from being retained in the title server in a state of being duplicated. Particularly, in the case that there are many titles including materials whose reusing frequency is high, it is possible to effectively use the retention unit of the server. In addition, since the materials are separately retained in accordance with their kinds, the reuse of materials in the registered title becomes easy. Accordingly, this embodiment can provide great practical effects.

(Fourth Embodiment)

Furthermore, a description will be made hereinbelow of a multimedia information distributing system according to a fourth embodiment of the present invention.

Figure 10:
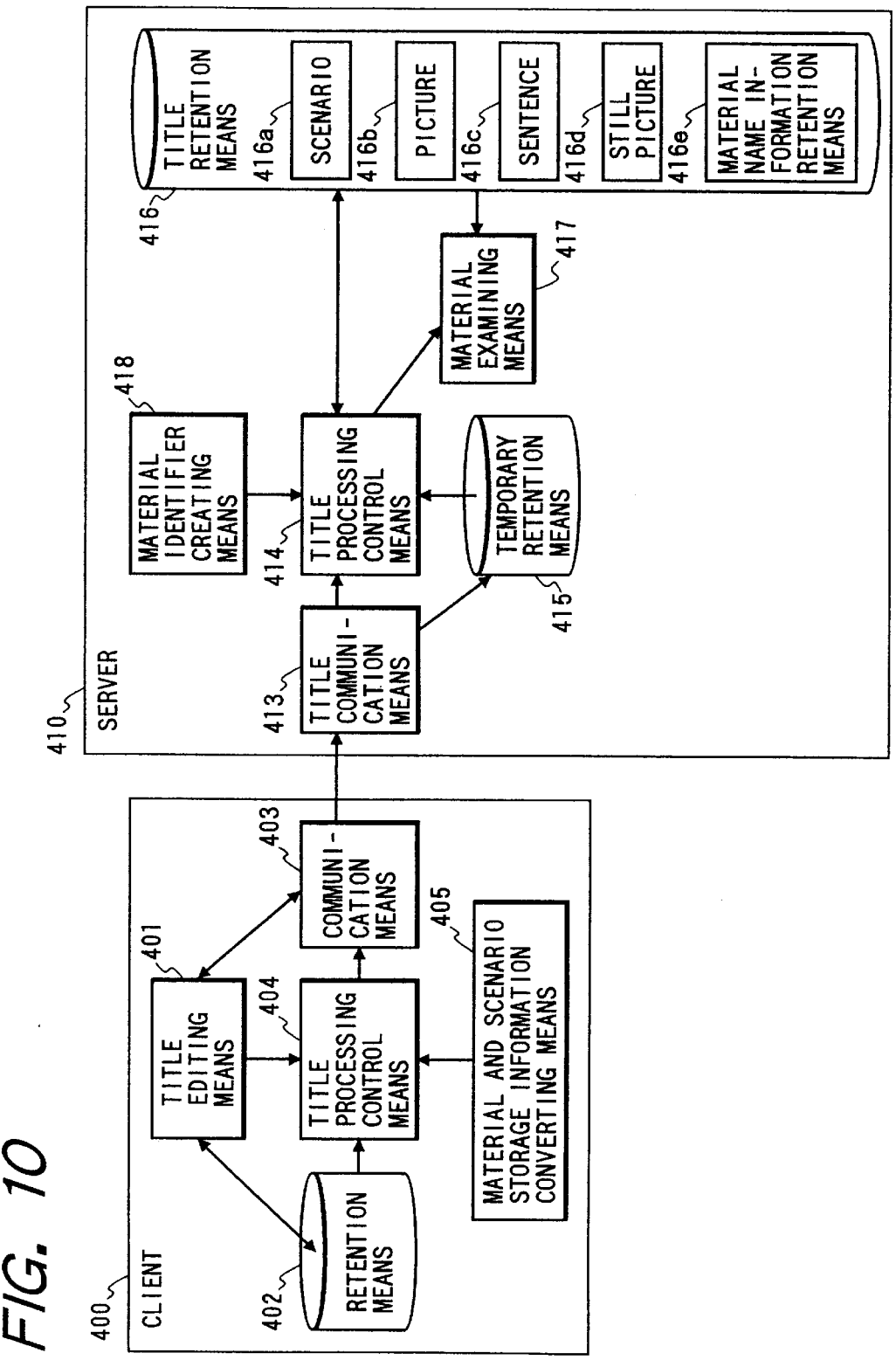
FIG. 10 is an illustration of an arrangement of a multimedia information distributing system according to a fourth embodiment of the present invention.

FIG. 10 is an illustration of an example of arrangements of the multimedia information distributing system according to this embodiment. In FIG. 10, reference numeral 400 stands for a client for creating a title, and numeral 410 depicts a server for registering the title.

The client 400 is composed of a title editing means 401 for creating a title and material and scenario storage information, a retention means 402 for retaining the materials in the client 400, a scenario(s) of the created title and the material and scenario storage information, a communication means 403 for conducting the transmission and reception of materials and for performing the transmission of a processing demand to a server, a title processing control means 404 for carrying out the registration processing of a title, and a material and scenario storage information converting means 405 having a conversion rule between an environment depending upon the client 400 and an internal environment of the server 410 to convert the material and scenario storage information into a format agreeing with each environment.

Furthermore, the server 410 comprises a title communication means 413 for receiving, from the client 400, a title processing demand and component data of a title to be processed, a title processing control means 414 for receiving the title processing demand from the client 400 and for retaining the remaining materials other than the materials the client 400 transmits, in a temporary retention means 415 before processing the specified title, the temporary retention means 415 for temporarily retaining the title from the client 400 before the title processing, a title retention means 416 for separately retaining the registered titles in accordance with materials, a material examining means 417 for checking whether or not the material constituting the specified title already exists in the title retention means 416, and a material identifier creating means 418 for creating an identifier for making the change to a single-meaning name at a new creation of materials in order to avoid the duplication between the name of the newly registered material and the name of the material already retained in the title retention means 416. Further, the title retention means 416 includes a scenario retention means 416a, a picture material retention means 416b, a sentence retention means 416c, a still picture retention means 416d, and a material name information retention means 416e for retaining information such as relation and correspondence between the new and old material names.

Figure 11:
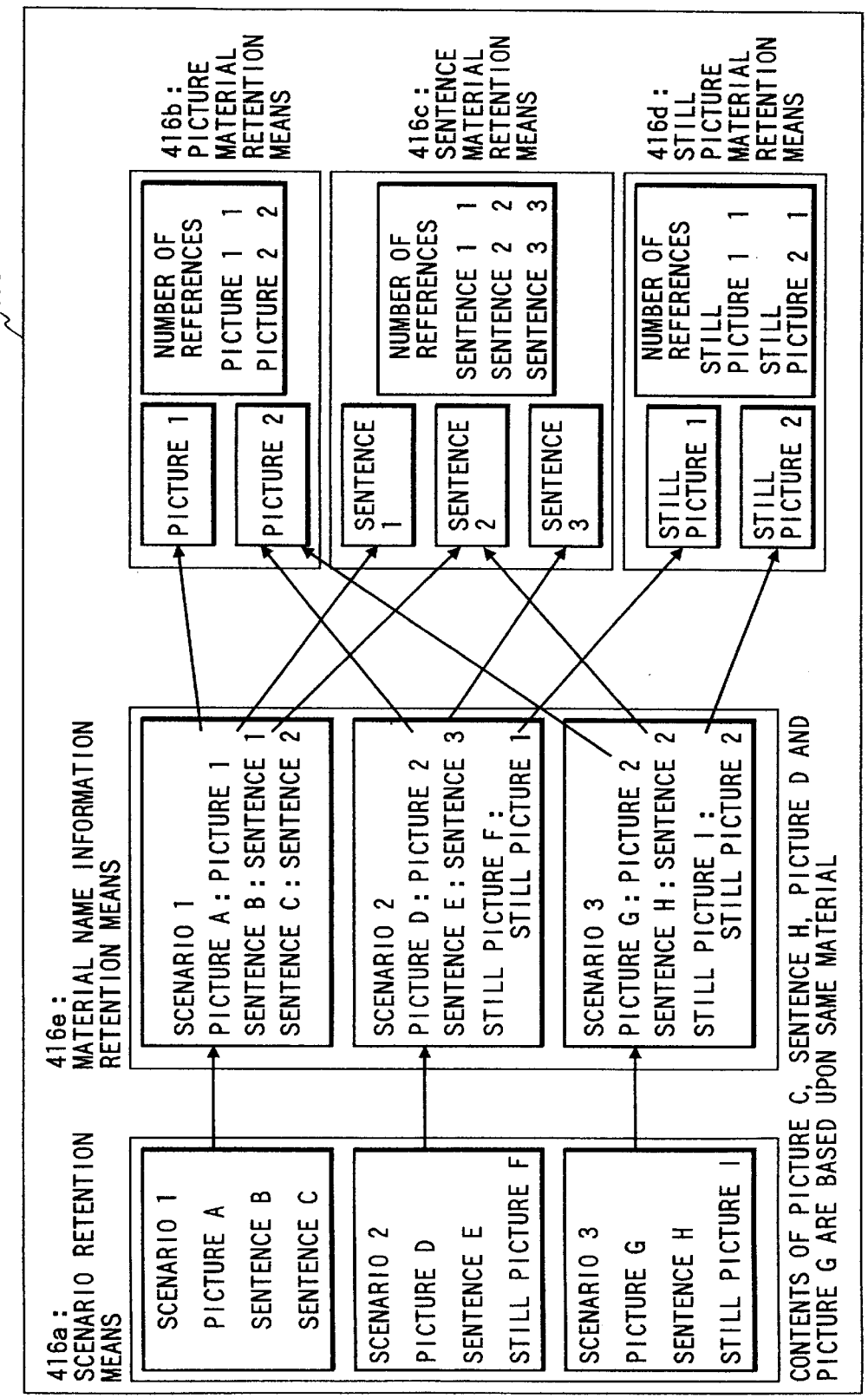
FIG. 11 is an illustration of a material communizing state and an indirect material specifying state in a scenario in the multimedia information distributing system according to the fourth embodiment of this invention.
Figure 12:
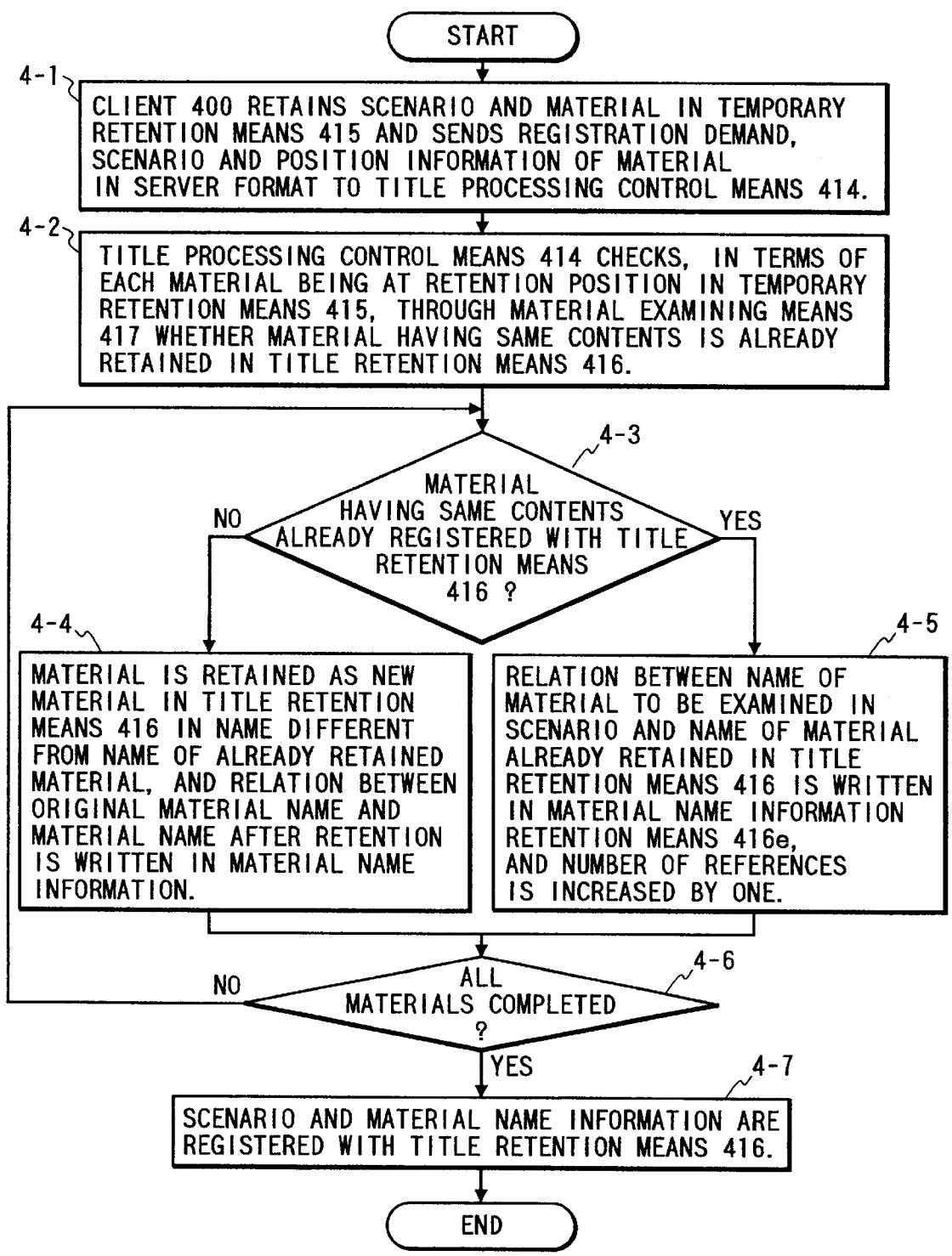
FIG. 12 is a flow chart showing an operation of the multimedia information distributing system according to the fourth embodiment of this invention.

FIG. 11 is an illustration of a material communizing state and an indirect material specifying state in a scenario in the multimedia information distributing system according to this embodiment, showing a state of registering a title by making information about the relation and correspondence between the new and old material names at every scenario without updating the original material names and the contents of the scenario unlike the above-described third embodiment. FIG. 12 is a flow chart showing the flow of an operation of the multimedia information distributing system according to this embodiment.

Referring to FIGS. 10 to 12, a description will be made hereinbelow of an operation taken for when a title edited in the client 400 is registered through the material and scenario storage information with the server 410 in the multimedia information distributing system thus arranged.

In FIG. 12, in a step 4-1, the client 400 retains all the materials of the specified title in the temporary retention means 415 of the server 410, and transmits a registration demand and server recognition information being storage information about the scenario and materials of the aforesaid title in a server's format.

In a step 4-2, in terms of the respective material data constituting the specified title, the title processing control means 414 checks whether or not the material having the same contents exists in the title retention means 416.

In a step 4-3, if the material with the same contents is already registered in the title retention means 416, the operational flow advances to a step 4-5. On the other hand, if not, the operational flow proceeds to a step 4-4 (The above operations are completely the same as those of the steps 3-1 to 3-3 of FIG. 6 in the third embodiment. The step 4-4 and the following steps are different from the third embodiment.).

In the step 4-4, in the case of newly registering a material to be processed, the corresponding material name within the scenario is left untouched, and through the adjustment of the material identifier creating means 418, the material to be newly registered is named to avoid the duplication with the materials already registered in the title retention means 416 and registered with the title retention means 416. In addition, the relation between the original name of the registered material and the material name after the registration is written in material name information.

In the step 4-5, on the other hand, if no registration of the material is made because the same material already exists in the title retention means 416, the corresponding material name within the scenario is left untouched while the corresponding material position column of the material and scenario storage information is changed to the existing material name with the same contents and the number of references from the title of the corresponding material data within the title retention means 416 is increased by one.

In a step 4-6, the above-described steps 4-3 to 4-6 are repeatedly executed for all the materials constituting the title to be processed.

In a step 4-7, finally, the title processing control means 414 retains the scenario(s) of the specified title in the scenario retention means 416a and retains the material name information in the material name information retention means 416e. Although in the description of this embodiment the material and scenario storage information is used to leave the material names, the creation of a completely new file is also feasible.

As described above, according to this embodiment, means is additionally provided to create and retain the material name information being different data and showing the relation between the original material name and the registered material name at the material registration without changing the material names within the scenario, and therefore, when the client obtains a title from the server, it is possible to obtain scenarios and materials with the names immediately before the registration of the title on the server without changing the contents and arrangement of the scenario, which can great practical effects.

(Fifth Embodiment)

A description will be made hereinbelow of a multimedia information distributing system according to a fifth embodiment of the present invention.

Figure 13:
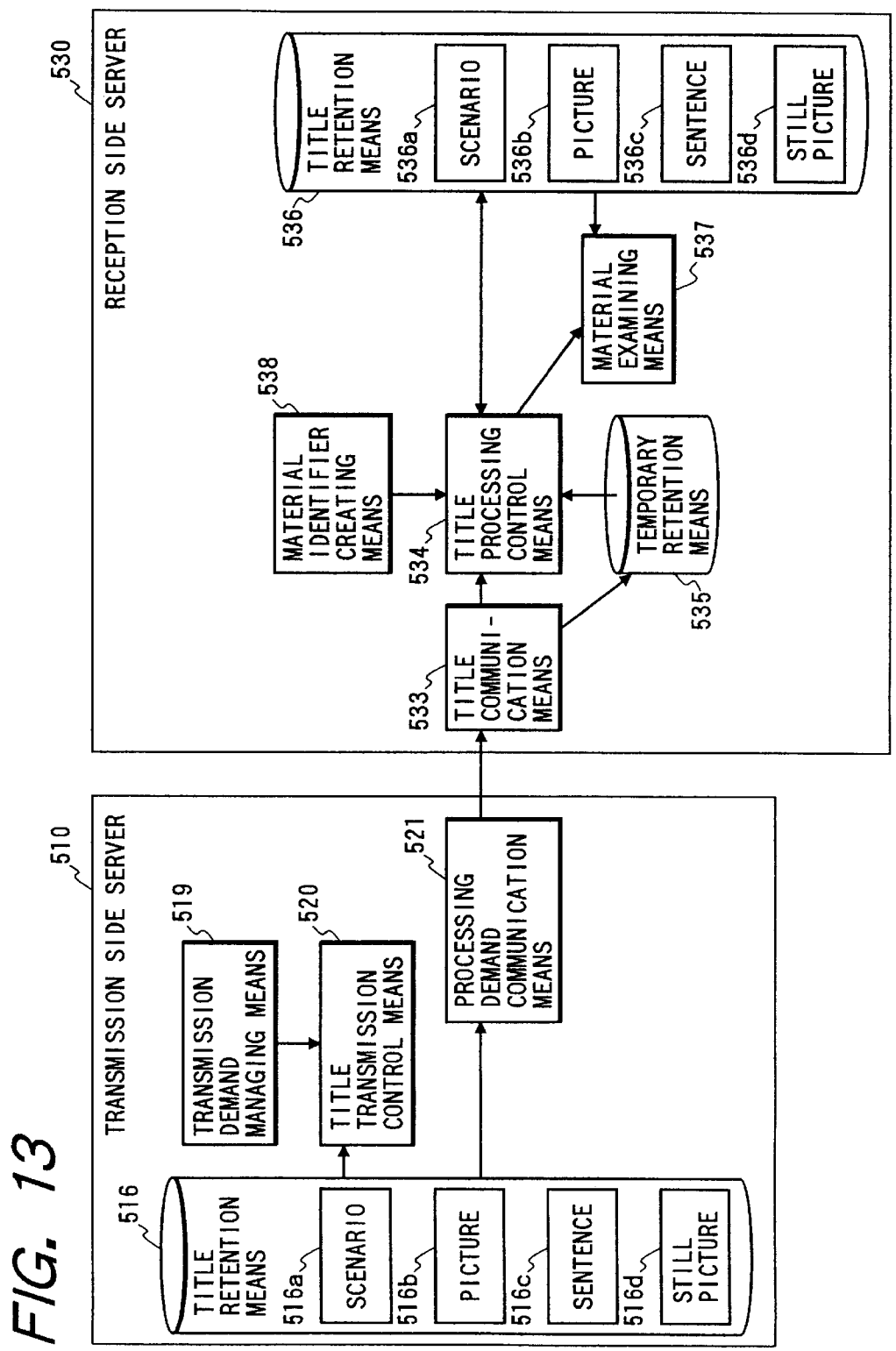
FIG. 13 is an illustration of an arrangement of a multimedia information distributing system according to a fifth embodiment of the present invention.

FIG. 13 is an illustration of an example of arrangements of the multimedia information distributing system according to this embodiment. In FIG. 13, numeral 510 signifies a title transmission side server, and numeral 530 denotes a title reception side server.

The transmission side server 510 includes a transmission demand managing means 519 for managing a transmitting title, a list of processing and a transmitting time and further for issuing a demand for transmission when reaching a transmitting time, a title transmission control means 520 for making out a list of scenarios and materials of titles to be sent together and further for controlling the acquisition of titles and transmission processing, a title retention means 516 for separately retaining the scenario(s) and material data of a registered title in the server 510 in accordance with the kinds of data, and a processing demand communication means 521 for transmitting a title processing demand to the title reception side server 530 and further for receiving the processing result from the title reception side server 530. The title retention means 516 is made up of a scenario retention means 516a, a picture material retention means 516b, a sentence retention means 516c and a still picture retention means 516d.

The reception side server 530 comprises a title communication means 533 for receiving, from the server 510, the title processing demand and the component data of the title to be processed, a title processing control means 534 for processing a plurality of specified titles on the basis of the title processing demand and the list of scenarios and materials received from the server 510, a temporary retention means 535 for temporarily retaining the title component data from the server 510 before the title processing, a title retention means 536 for separately retaining the registered titles in accordance with materials, a material examining means 537 for checking whether or not the materials constituting the specified title already exist in the title retention means 536, and a material identifier creating means 538 for creating an identifier for making the change to a single-meaning data name at new registration of a material in order to avoid the duplication of the material already retained in the title retention means 536 and the name of the material to be newly registered.

Figure 14:
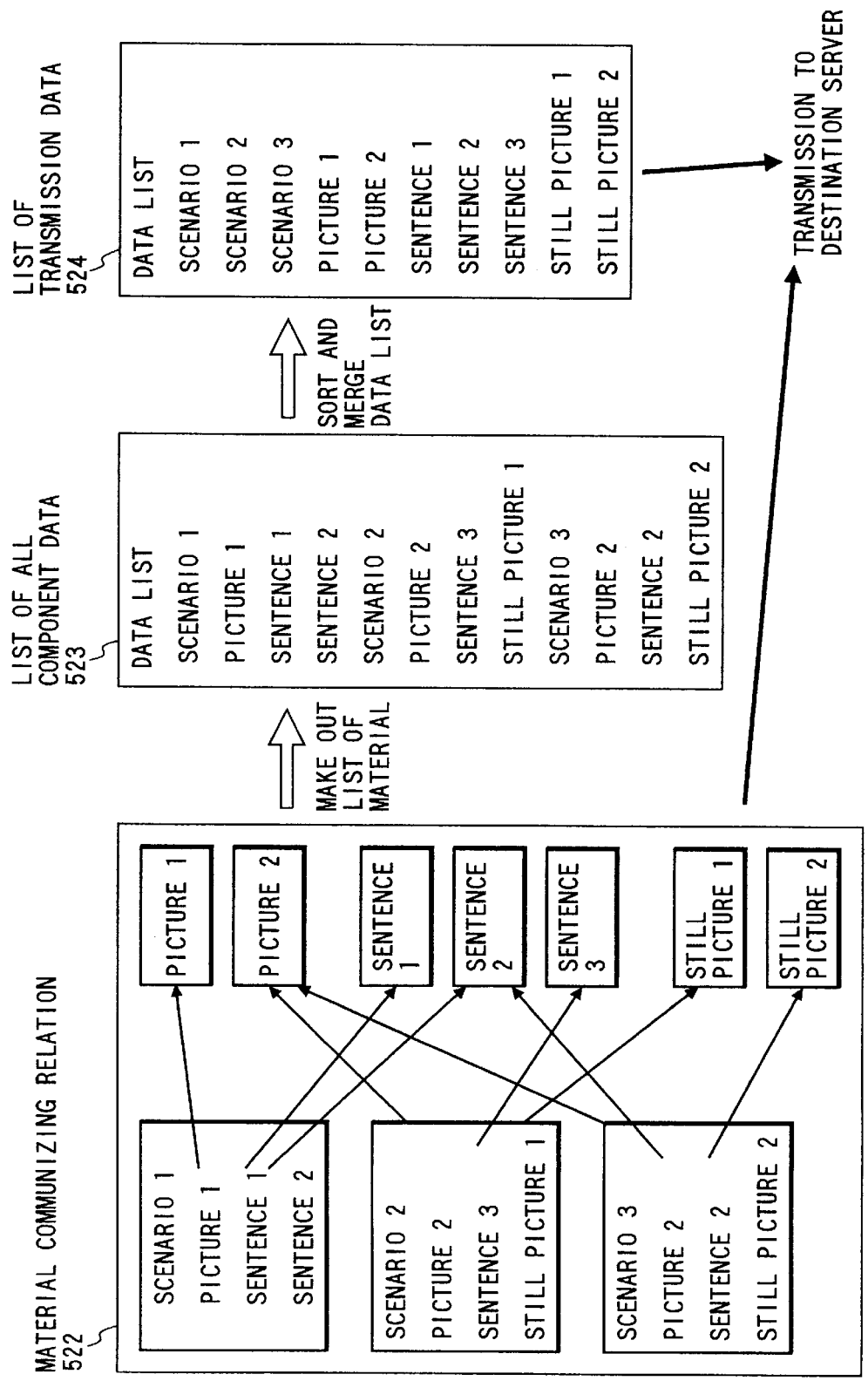
FIG. 14 is an illustration of the relationship among materials to be transmitted in a communizing condition, scenarios and a list of transmission data, in the multimedia information distributing system according to the fifth embodiment of this invention.
Figure 15:
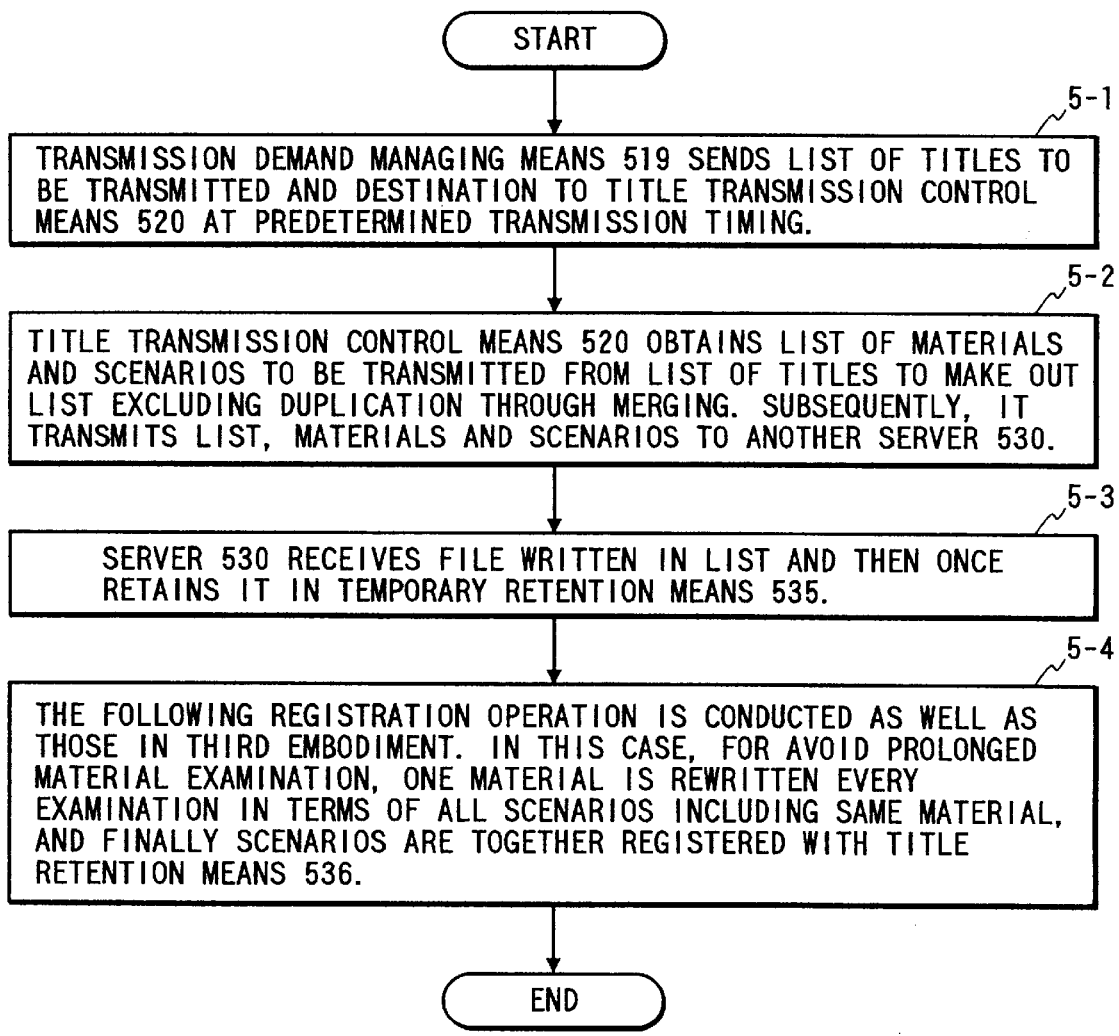
FIG. 15 is a flow chart showing an operation of the multimedia information distributing system according to the fifth embodiment of this invention.
Figure 16:
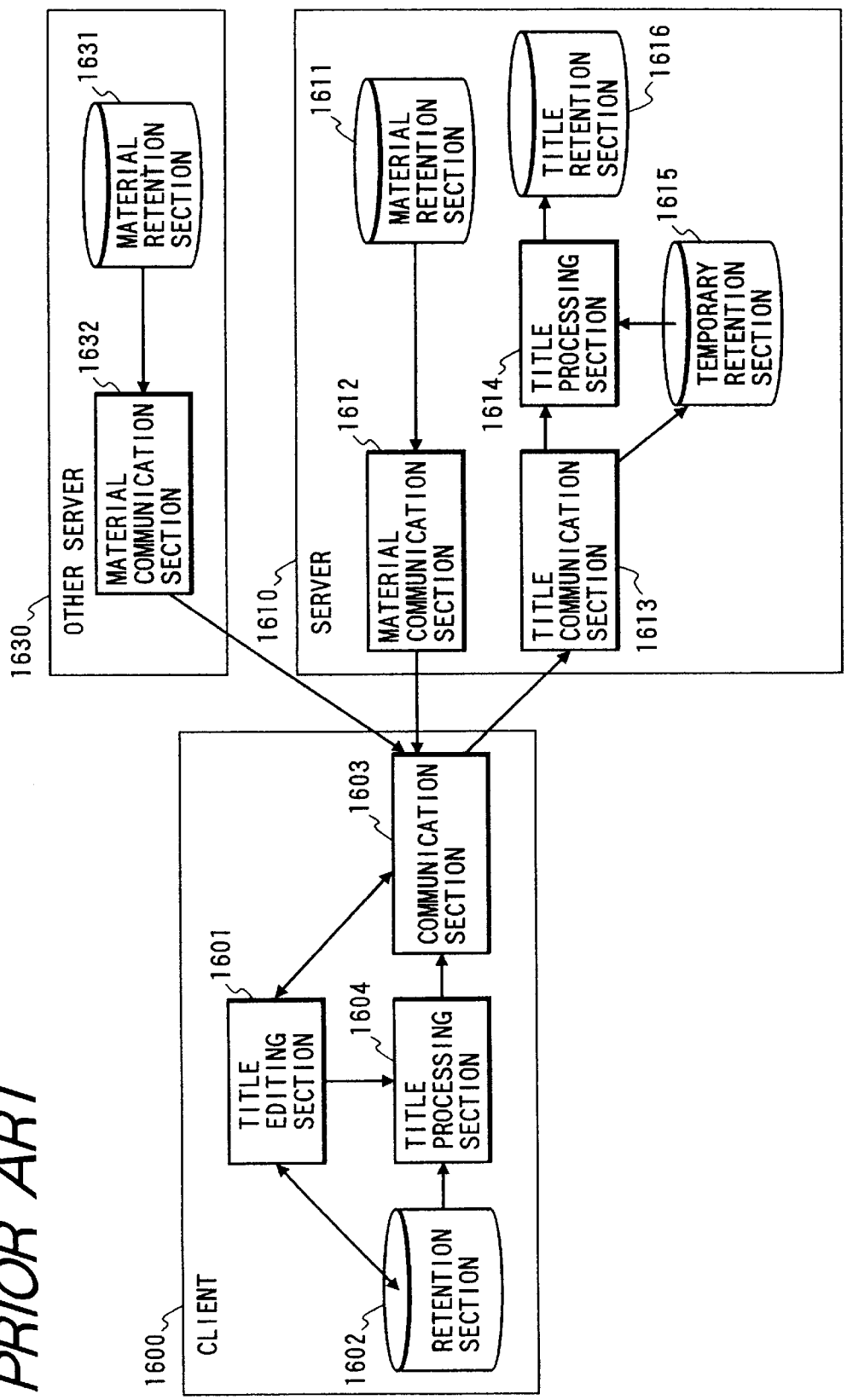
FIG. 16 is an illustration of an arrangement of a prior multimedia information distributing system.

FIG. 14 is an illustration of the relationship among materials to be transmitted in a communizing condition, scenarios and data to be transmitted, in the multimedia information distributing system according to this embodiment. In FIG. 14, numeral 522 signifies a material communizing relationship of a title to be transmitted in a form within the title retention means 516, numeral 523 represents a list of all component data of the transmitted title obtained from the aforesaid title, and numeral 524 denotes a list of the transmitted data produced by sorting and merging the list 523 of all the component data. FIG. 15 is a flow chart showing the flow of an operation of the multimedia information distributing system according to this embodiment.

Referring to FIGS. 13 to 15, a description will be made hereinbelow of an operation taken for when a tile retained in the server 510 is registered with the server 530 referring to the material and scenario storage information, in the multimedia information distributing system thus arranged.

In FIG. 15, in a step 5-1, in the server 510 a destination of the title and a transmitting time are set in advance in the transmission demand managing means 519. In accordance with the demand from a client or the like, a title to be newly processed is added to a list of titles to be transmitted in the transmission demand managing means 519. The transmission demand managing means 519 sends a list of a plurality of titles to be transmitted, the destinations thereof and a transmission demand to the title transmission control means 520 at the set transmitting time.

In a step 5-2, the title transmission control means 520 obtains of a scenario of the title list from the title retention means 516. In the title transmission control means 520, all the component data of the title as shown in the all-component data list 523 are obtained and sorted and merged to make out a list of transmission data as shown in the transmission data list 524. Subsequently, the title transmission control means 520 transmits a registration processing demand and the transmission data list through the processing demand communication means 521 to the server 530.

In a step 5-3, the title communication means 33 receives the registration processing demand and the transmission data list 524 from the server 510, with all the scenario and material data written in the list 524 being retained in the title temporary retention means 535.

In a step 5-4, subsequently, the title processing control means 534 performs the registration in a state that the materials are communized as well as in the third embodiment. However, in this embodiment, the change of the scenario written material names is made in terms of all of a plurality of scenarios utilizing the material to be registered. The title processing control means 534 destroys the transmission data list 524 after the completion of the registration of the scenario and material data with the title retention means 536.

As described above, according to this embodiment, the transmission and reception of titles are made between the transmission side server 510 having means for making out and transmitting a list of materials to be sent at transmission of a plurality of titles between servers and the reception side server 530 having means for receiving the materials in a state of being communized referring to the aforesaid list and further for retaining the materials together in a state where the materials are communized. Therefore, for example, in the case of transmitting a plurality of titles together (including the compression) to a different server during the nighttime period that the transmission circuit use charge is cheap, it is possible to reduce the transferring data quantity to improve the transmission circuit use efficiency, and further to reduce the load on a network between servers by transmitting materials in a communized condition when a plurality of titles are transmitted together between the servers. Accordingly, great practical effects are obtainable.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A multimedia information distributing system comprising a client for creating a title composed of a material and a scenario showing a reproducing procedure for said material and a server for registering said title, with said client and said server being in communicable relation to each other, said client including:
title editing means for creating said title and further for creating material and scenario storage information showing a storage condition of said material and said scenario necessary for the creation of said title;
retention means for retaining said material, said scenario of said title created by said title editing means, and said material and scenario storage information;
communication means for carrying out transmission and reception of said material and further for conducting transmission of said scenario, said material and scenario storage information and a title registration instruction for permitting registration of said title with said server;
material and scenario storage information converting means for making at least one of mapping and conversion between client recognition information being said material and scenario storage information recognizable on the client side and server recognition information being said material and scenario storage information recognizable on the server side; and
title processing control means for controlling said title editing means, said retention means, said communication means and said material and scenario storage information converting means and further for creating said title registration instruction,
said server including:
title communication means for receiving said material and scenario constituting said title, said material and scenario storage information, and said title registration instruction;
temporary retention means for temporarily retaining said material and said scenario received by said title communication means;
title retention means for registering said title composed of said material and said scenario retained in said temporary retention means; and
title processing control means for controlling said title communication means, said temporary retention means, and said title retention means,
wherein, after said material and said scenario transmitted from said client are retained in said temporary retention means, said title processing control means of said client gives an instruction to said material and scenario storage information converting means to convert said material and scenario storage information of said title retained in said temporary retention means, which is said client recognition information, into said server recognition information and transmits said server recognition information and said title registration instruction of said title to said server, and further, said title processing control means of said server registers on said title retention means the title comprising said material and said scenario retained in said temporary retention means on the basis of the transmitted server recognition information and said title registration instruction.

2. A multimedia information distributing system comprising a client for creating a title composed of materials and a scenario showing a reproducing procedure for said materials and a server for registering said title, with said client and said server being in communicable relation to each other, said client including:
title editing means for creating said title and further for creating material and scenario storage information showing a storage condition of said materials and said scenario necessary for the creation of said title;
retention means for retaining said materials, said scenario of said title created by said title editing means, and said material and scenario storage information;
communication means for carrying out transmission and reception of said materials and further for conducting transmission of said scenario, said material and scenario storage information and a title registration instruction for permitting registration of said title with said server; and
title processing control means for controlling said title editing means, said retention means and said communication means, and further for creating said title registration instruction,
said server including:
title communication means for receiving said materials and scenario constituting said title, said material and scenario storage information, and said title registration instruction;
temporary retention means for temporarily retaining said materials and said scenario received through said title communication means;
title retention means for registering said title composed of said materials and said scenario retained in said temporary retention means; and
title processing control means for controlling said title communication means, said temporary retention means, and said title retention means,
wherein said title processing control means of said client give an instruction to said communication means to send to said server, of said materials, a material defying reference and collection from said server, while said title processing control means of said server gives an instruction to said title communication means to collect said materials other than said material from said client.

3. A multimedia information distributing system comprising a client for creating a title composed of a material and a scenario showing a reproducing procedure for said material and a server for registering said title, with said client and said server being in communicable relation to each other, said client including:
title editing means for creating said title and further for creating material and scenario storage information showing a storage condition of said material and said scenario necessary for the creation of said title;
retention means for retaining said material, said scenario of said title created by said title editing means, and said material and scenario storage information;
communication means for carrying out transmission and reception of said material and further for conducting transmission of said scenario, said material and scenario storage information and a title registration instruction for permitting registration of said title with said server;

material and scenario storage information converting means for making at least one of mapping and conversion between client recognition information being said material and scenario storage information recognizable on the client side and server recognition information being said material and scenario storage information recognizable on the server side; and title processing control means for controlling said title editing means, said retention means, said communication means and said material and scenario storage information converting means and further for creating said title registration instruction, said server including:

title communication means for receiving said material and scenario constituting said title, said material and scenario storage information, and said title registration instruction;

temporary retention means for temporarily retaining said material and said scenario received by said title communication means;

title retention means for registering said title in units of said scenario retained in said temporary retention means and a kind of said material;

material examining means for checking whether or not said material constituting said title specified by said client is already retained in said title retention means; and title processing control means for controlling said title communication means, said temporary retention means, said title retention means and said material examining means, wherein, when said title retention means registers said title, said title processing control means of said server updates the contents of said scenario constituting said title and the name of said material on the basis of the comparison of an examination result of said material examining means with said material retained in said title retention means.

4. A multimedia information distributing system comprising a client for creating a title composed of a material and a scenario showing a reproducing procedure for said material and a server for registering said title, with said client and said server being in communicable relation to each other, said client including:

title editing means for creating said title and further for creating material and scenario storage information showing a storage condition of said material and said scenario necessary for the creation of said title;

retention means for retaining said material, said scenario of said title created by said title editing means, and said material and scenario storage information;

communication means for carrying out transmission and reception of said material and further for conducting transmission of said scenario, said material and scenario storage information and a title registration instruction for permitting registration of said title with said server;

material and scenario storage information converting means for making at least one of mapping and conversion between client recognition information being said material and scenario storage information recognizable on the client side and server recognition information being said material and scenario storage information recognizable on the server side; and title processing control means for controlling said title editing means, said retention means, said communication means and said material and scenario storage information converting means and further for creating said title registration instruction, said server including:

title communication means for receiving said material and scenario constituting said title, said material and scenario storage information, and said title registration instruction;

temporary retention means for temporarily retaining said material and said scenario received by said title communication means;

title retention means for registering said title in units of said scenario retained in said temporary retention means and a kind of said material;

material examining means for checking whether or not said material constituting said title specified by said client is already retained in said title retention means;

title processing control means for controlling said title communication means, said temporary retention means, said title retention means and said material examining means; and means for, when said title specified by said client is registered with said title retention means, creating information about the relation between the name of said material, constituting said title, before the registration and the name of said material after the registration.

5. A multimedia information distributing system comprising a transmission server having a title comprising a material and a scenario showing a reproducing procedure for said material and a reception server for registering said title, with said transmission server and said reception server being in communicable relation to each other, said transmission server including:

title retention means having said title in units of said scenario and a kind of said material;

communication means for performing transmission of said scenario and material constituting said title; and title transmission control means for controlling said title retention means and said communication means, said reception server including:

title communication means for receiving said material and scenario constituting said title;

title retention means for registering said title in units of said scenario constituting said title and a kind of said material; and title processing control means for controlling said title communication means and said title retention means, wherein, when a plurality of titles said title retention means of said transmission server possesses are registered with said reception server, said title transmission control means communizes materials constituting said plurality of titles and then transmits said materials and scenarios constituting said titles, while said title processing control means registers the transmitted scenarios and materials with said title retention means in a form left untouched.

* * * * *